Figure 1:
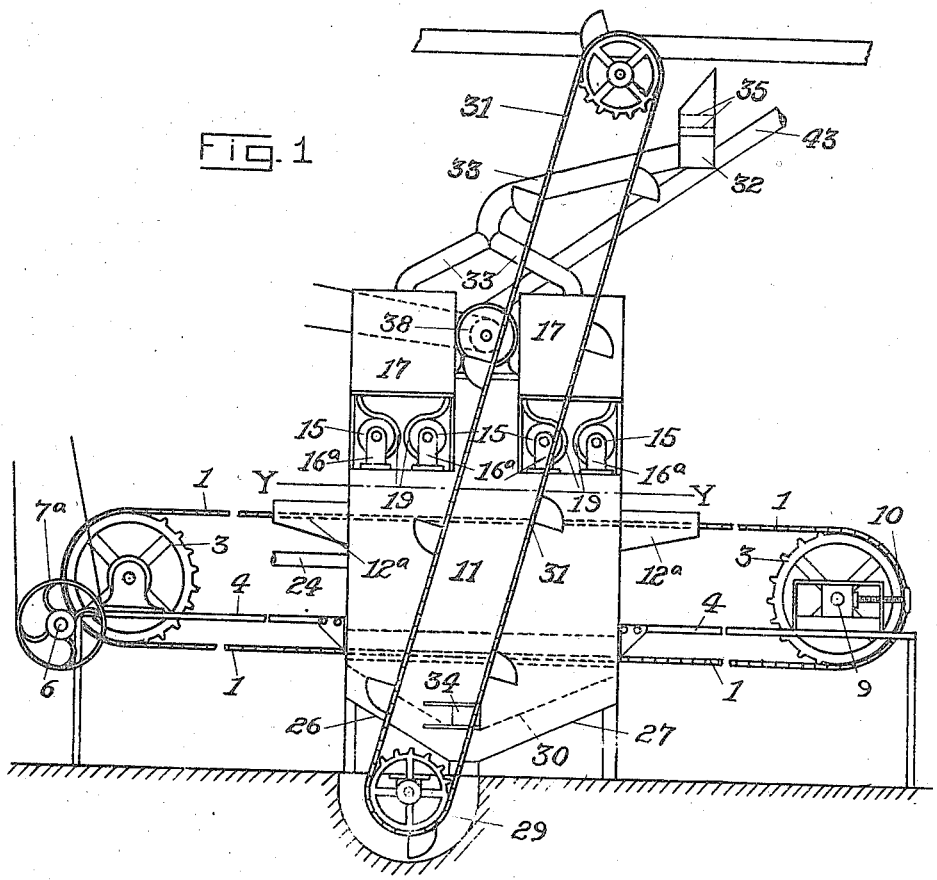

F. V. RAYMOND.
APPARATUS FOR THE TREATMENT OF KAURI AND OTHER LIKE GUMS.
APPLICATION FILED AUG. 15, 1913.

1,249,493.

Patented Dec. 11, 1917.

7 SHEETS—SHEET 1.

Witnesses:
M. J. Whittaker
H. F. Smith

Inventor:
Frank Victor Raymond
per
Edgar S. Brittell
Attorney.

F. V. RAYMOND.
APPARATUS FOR THE TREATMENT OF KAURI AND OTHER LIKE GUMS.
APPLICATION FILED AUG. 15, 1913.
1,249,493.
Patented Dec. 11, 1917.
7 SHEETS—SHEET 2.
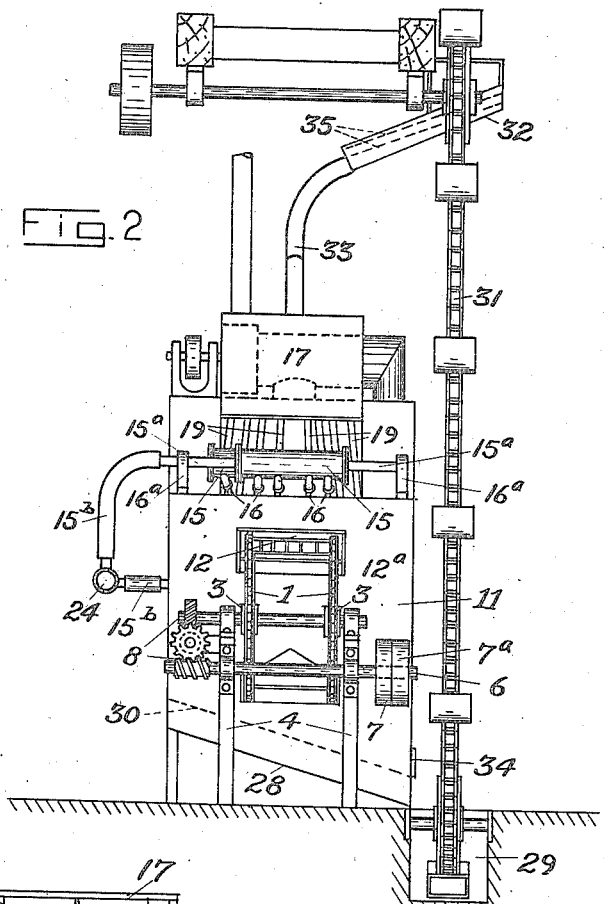
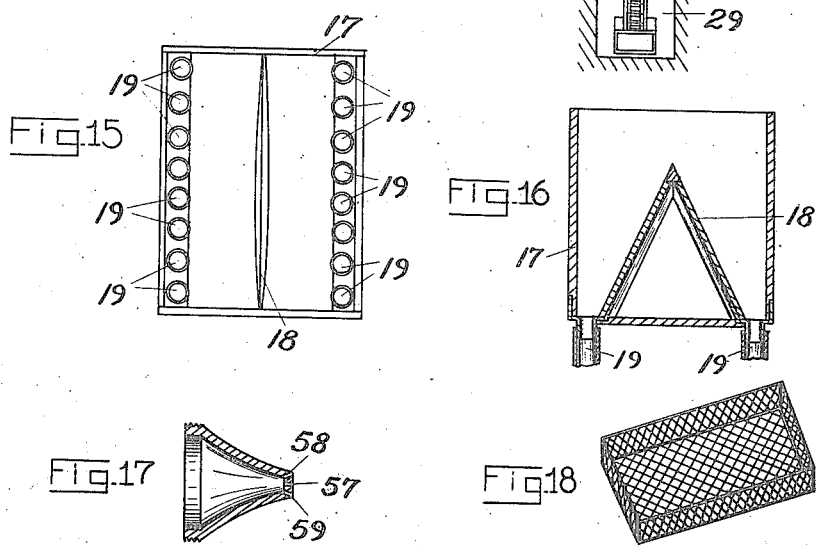

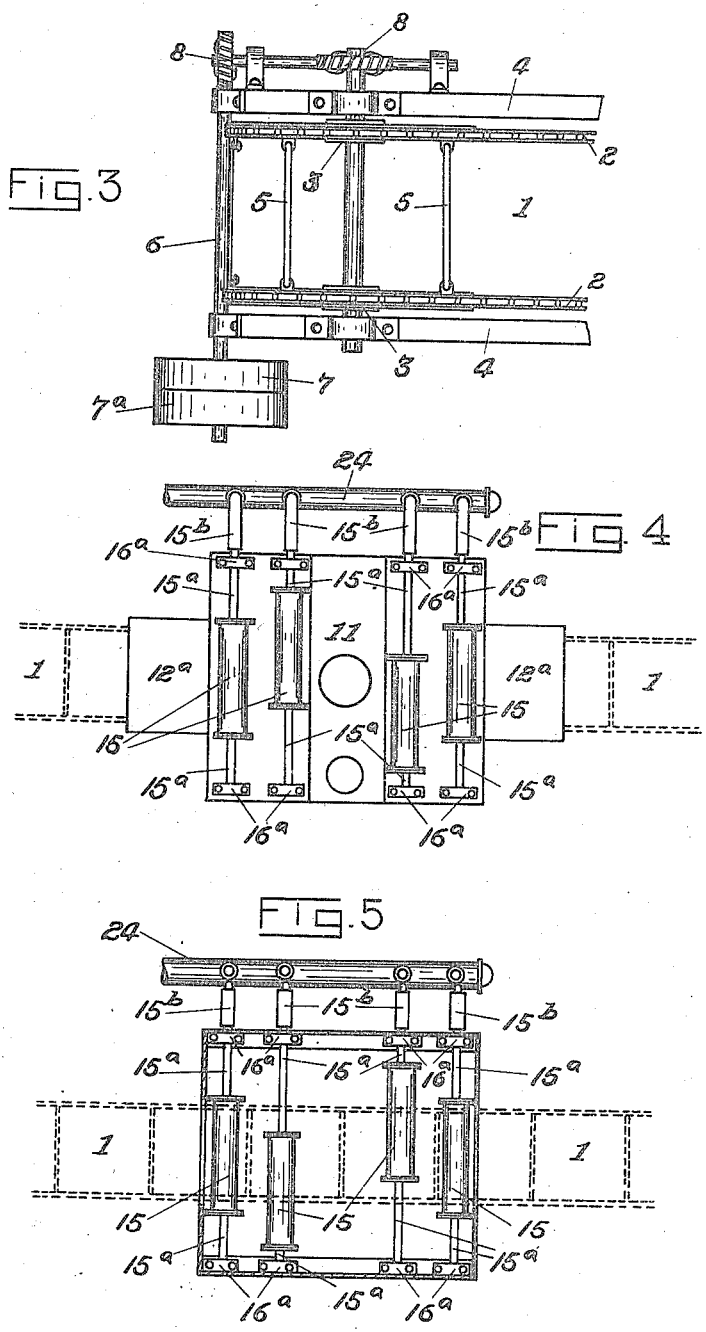

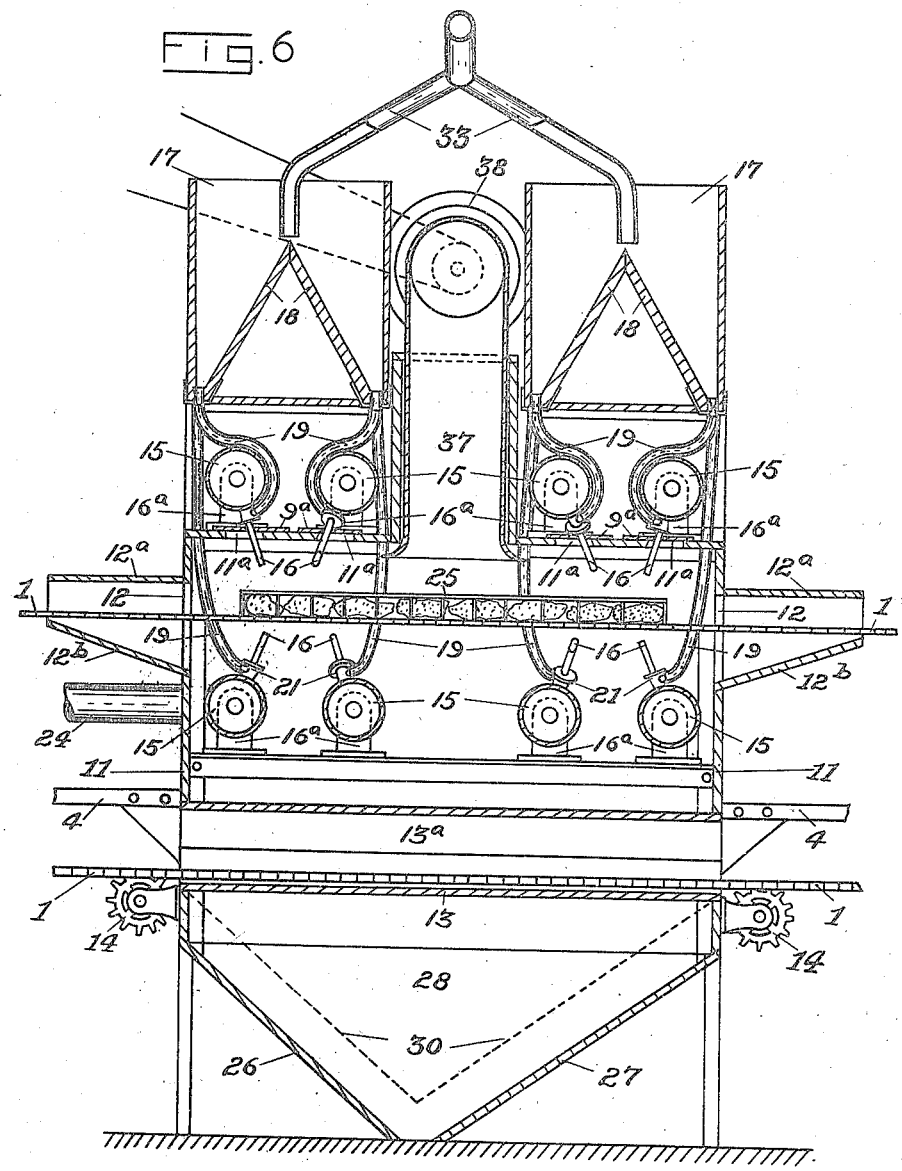

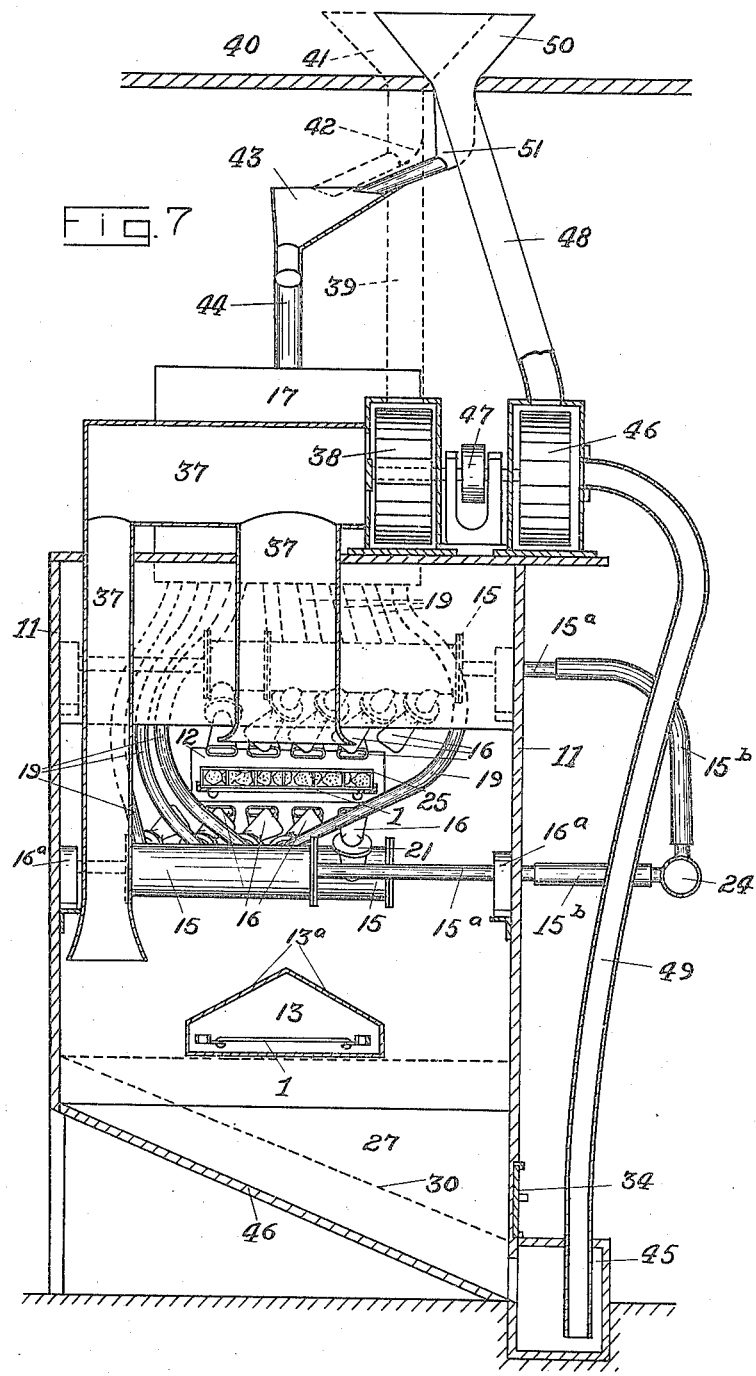

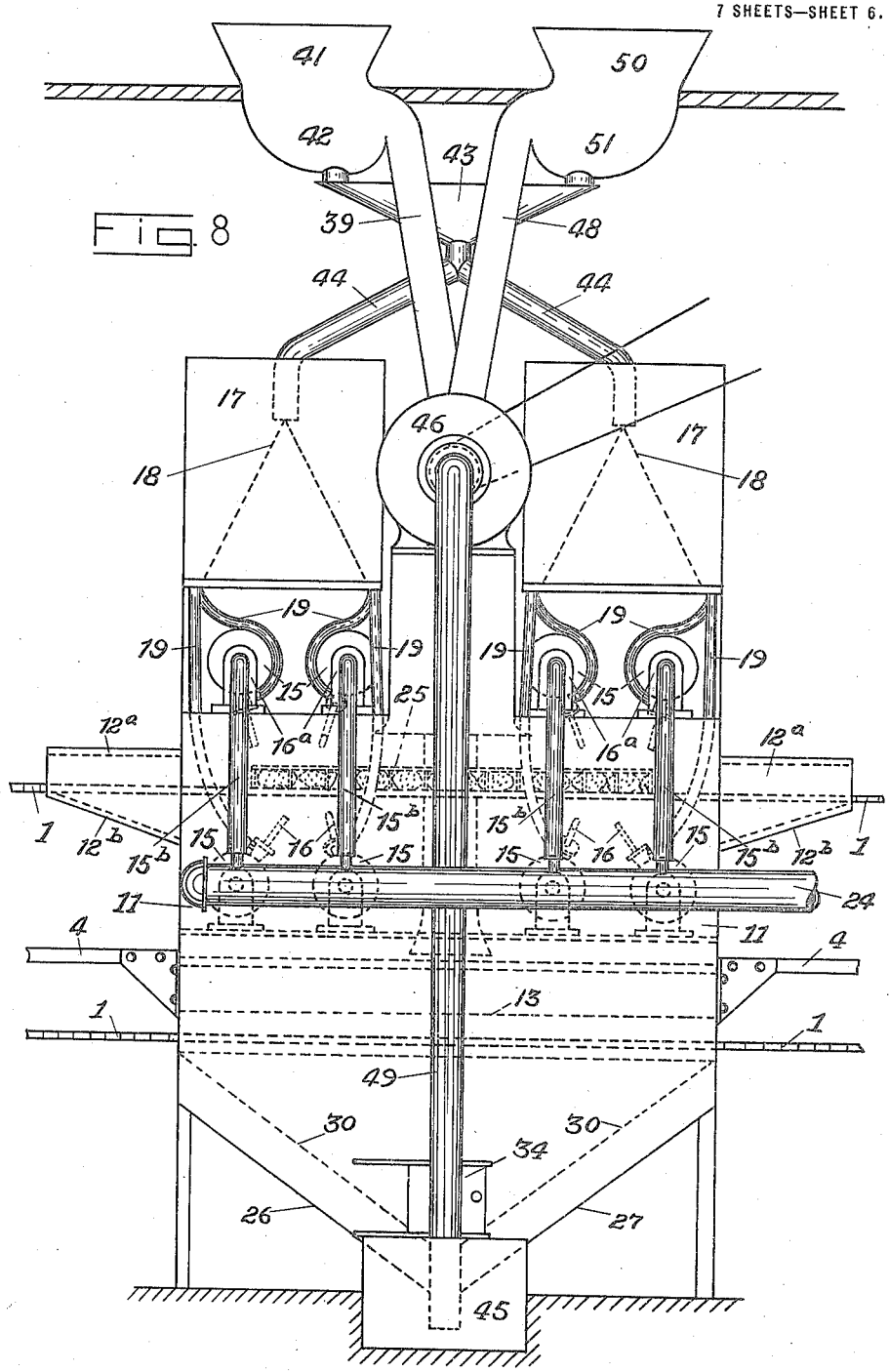

UNITED STATES PATENT OFFICE.

FRANK VICTOR RAYMOND, OF MOUNT EDEN, NEW ZEALAND.

APPARATUS FOR THE TREATMENT OF KAURI AND OTHER LIKE GUMS.

1,249,493.         Specification of Letters Patent.     Patented Dec. 11, 1917.

Application filed August 15, 1913. Serial No. 784,943.

*To all whom it may concern:*

Be it known that I, FRANK VICTOR RAYMOND, a subject of His Majesty the King of the United Kingdom of Great Britain and Ireland, resident of Esplanade Road, Mount Eden, near the city of Auckland, in the Provincial District of Auckland and Dominion of New Zealand, have invented a new and useful Improved Apparatus for the Treatment of Kauri and other like Gums, of which the following is a specification.

This invention relates to the cleaning of kauri and other like gums, which are found in pieces of various sizes and shapes and nearly always having rough and uneven surfaces. A casing or incrustation of corroded or poorer gum of comparatively small value, surrounds or covers these pieces, the removal of which greatly adds to the value of the commodity.

At present the gum pieces are scraped and rescraped by hand, involving much time and labor, besides which a good proportion of the good or valuable gum is lost.

This invention has been projected for the purpose of expediting and more thoroughly performing the cleaning of the gum, by one operation with a minimum amount of loss of good gum, and a minimum employment of labor.

This result is achieved to a highly successful degree by forcing sand under the medium of compressed air through a nozzle or nozzles directed upon the gum pieces from different angles at a sufficient pressure. It is however found that manually directing the sand blast on the gum whether held by the hand or in cages, is a laborious process, and the turning over the gum pieces by mechanical movement while under the treatment in any vessel or frame or conveyer, makes it impossible to secure systematic cleaning. Therefore, the sand blast which is substantially claimed in its application to the cleaning of gum, is combined with other mechanical arrangements hereinafter set forth to improve the effectiveness of such process.

The invention further consists of a central cabinet or casing within which the blasts are confined, the gum being placed on an endless conveyer, and passed through the cabinet or casing, at a speed determined by the number and the intensity of the sand blasts, so that the gum remains within the cabinet only long enough to have the outer casing or incrustation removed without injury to the more valuable product.

The blasts are directed from headers fitted with removable nozzles, placed in such positions, both above and below the gum, that the latter is thoroughly treated on all sides. The sand gravitates or is fed through feed pipes from hoppers situated above the cabinet to the header nozzles, where it comes in contact with or is operated on by the air blast, and is forced out through the nozzles on to the gum as the latter travels through the cabinet. After use, the sand is precipitated to a sand pit at the bottom of the cabinet, where it is picked up by an elevator and caused to return to the hoppers. The action of the sand on the casing or incrustations causes the latter to be forced off the gum in the form of a fine powder, and this, together with an admixture of sand is withdrawn from the cabinet or casing by means of suction pipes and fan, and forced into a pipe leading to a settling room. During transit thereto, the heavier dust and any sand that may have also been drawn from the cabinet, is separated from the finer dust and returned to the sand hoppers so that only the finer dust is permitted to enter the settling room.

The gum conveyer is of an open formation so as to allow as much as possible of the blasts to act on the gum, which is preferably placed in trays the mesh of which depends on the size of the gum being treated. In the case of very small gum pieces, meshed covers or lids may be used to prevent the gum being dislodged by the force of the blasts.

Figure 9:
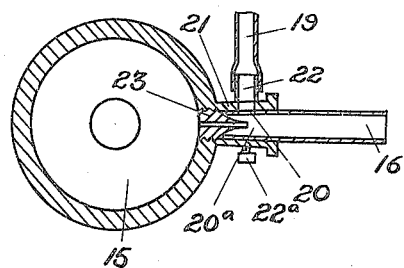
Figure 10:
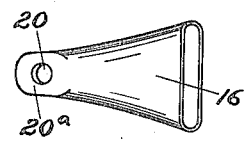
Figure 11:
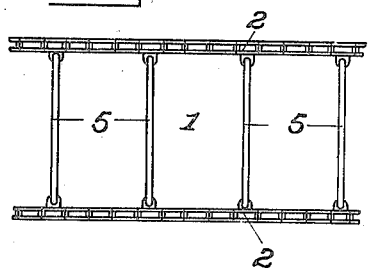
Figure 12:
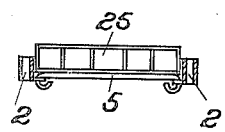
Figure 13:
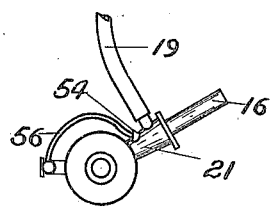
Figure 14:
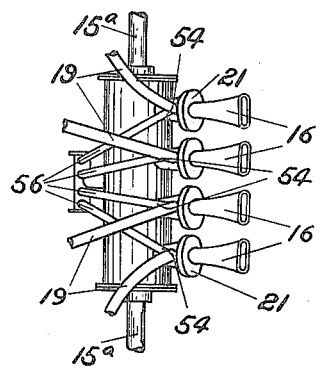

The invention will be more readily understood on referring to the accompanying drawings, of which, Figure 1 is a side elevation (shown broken) of the complete machine and showing a bucket conveyer for elevating or returning the used sand to the hoppers, Fig. 2 is an end elevation (from the driving end of the machine,) as illustrated in Fig. 1, Fig. 3 shows by means of an enlarged plan view, a portion of the endless gum conveyer and the worm gears, and pulleys for driving same, Fig. 4 is a plan view of the central casing or cabinet of the machine (with sand hoppers and suction fans and pipes removed) showing the positions of the upper cross headers, Fig. 5 is a sectional plan of the cabinet taken through Y—Y Fig. 1, and showing the positions of the lower cross headers, Fig. 6 is an enlarged longitudinal sectional elevation of the cabinet showing the positions of upper and lower cross headers, sand feed pipes, nozzles, dust suction pipe and fan, sand hoppers, a portion of endless gum conveyer and means for screening and gravitating used sand to the sand pit for return to the hoppers by a bucket or suction conveyer, Fig. 7 is an enlarged cross sectional view of the cabinet showing the positions of headers and nozzles, dust suction pipes and fans, and means for screening and gravitating used sand to sand pit, and a modified form of elevator for returning used sand to the hoppers, Fig. 8 is a side elevation (from air compressor pipe side) of the cabinet as illustrated in Fig. 7, showing suction elevator and means for returning the used sand to hoppers, Fig. 9 is a cross sectional view of the header taken through one of the nozzles showing the air discharge nipple fitted therein, and also sand feed attachment, Fig. 10 shows in perspective, one of the removable nozzles for use on the headers, Fig. 11 is a plan view of portion of the endless gum conveyer showing construction of same, Fig. 12 is a cross section of the endless gum conveyer, showing a tray for gum in position thereon, Fig. 13 is an elevation, and Fig. 14 a plan view of an alternative form of header.

Fig. 15 is a plan view of one of the sand hoppers showing means for causing the even distribution of sand to the said feed pipes at each side, Fig. 16 is a cross sectional view of the same hopper, Fig. 17 shows in section an alternative form of jet for use with the headers and nozzles to insure an even spread of the sand blast, and Fig. 18 is a perspective view of a tray for holding small gum pieces while under treatment.

The endless conveyer 1 on which the gum is placed consists preferably of link chains 2, running around the sprocket wheels 3 mounted in pairs across each end of the horizontal oblong frame 4, and connected together at intervals by the cross slats 5, (Figs. 3, 11, and 12). The conveyer 1 is driven through worm gearing 8 from the shaft 6 on which is mounted a fast pulley 7 and a loose pulley $7^a$, any slackness or sagging that may occur being taken up at the opposite end by means of adjustable bearings 9 and hand screws 10 (Fig. 1).

The cabinet or casing 11 is built centrally over the endless conveyer 1, openings 12, (Figs. 2, 6, and 7), being provided in the sides facing the sprocket wheels 3 to enable the upper portion of the conveyer 1 with the trays of gum thereon to pass through. To prevent sand being driven out through the conveyer openings 12, short box-like covers $12^a$ are extended from the ends of the cabinet around the conveyer 1, the bottoms $12^b$ being made sloped or inclined so as to run the sand back into the cabinet through the openings 12 (Figs. 1, 6 and 8).

The lower portion of the conveyer 1 which travels in the reverse direction to the upper portion, passes through an inclosed or tunnel formation 13, (Figs. 6 and 7), in the lower portion of the cabinet and does not enter the cabinet or come in contact with the blasts. The top sides $13^a$ of the tunnel formation 13 are sloped or inclined as shown so as to shed the sand and dust that falls thereon. Sprocket wheels 14 can also be provided at the sides of the cabinet to assist in the prevention of sagging of the conveyer 1.

The headers 15, are placed crosswise preferably four above, and four below the upper portion of the conveyer 1, (Fig. 6), each header being provided with four removable nozzles 16. The upper headers 15 are mounted on the outside of the cabinet or casing 11, with their nozzles 16 projecting downward through slots $11^a$ as shown, (Fig. 6), the lower headers being mounted within the cabinet and having their nozzles 16 directed upward. Screwed in each end of the headers 15 are short pieces of piping $15^a$, which form the header spindles and support the headers in the bearings $16^a$. Connections $15^b$, preferably flexible to permit movement of the headers in the bearings connect the headers through the piping $15^a$, with the main pipe 24, from the air compressor for operating the blasts (Figs. 4, 5, 7 and 8).

The alinement of the upper headers is shown in Fig. 4, and that of the lower headers in Fig. 5, and it will be seen that in both cases, the intermediate headers are placed one toward each side of the cabinet 11. The nozzles 16 on these intermediate headers are fitted thereto so that the blasts will strike the gum at angles from each side, both from above and from below the upper side of the conveyer 1, as shown in Fig. 7. The end headers are directly above and below the upper portion of the conveyer, and together with the intermediate headers may be turned in their bearings $16^a$, so as to cause their nozzles 16 to direct the blasts to the gum from different angles. By means of this special arrangement of the headers 15, and the fittings of the nozzles 16 thereto, the gum is enabled to be acted upon by the sand blasts from many different directions and thus be thoroughly treated.

If it is desired that the blasts should be brought nearer to, or removed farther from, the gum, the headers 15 can be turned in their bearing 16ᵃ to accomplish either object, or if sufficient adjustment cannot be obtained in this manner, longer or shorter nozzles can be used as required. Also, where the nozzles of the upper headers project downward through the slots 11ᵃ in the cabinet, adjustable covering plates 9ᵃ (Fig. 6) are used, fitted to the nozzles to prevent the escape of dust from the cabinet.

Above the cabinet 11 are placed sand hoppers 17, each of which is fitted with an inverted V shaped partition 18 (Figs. 6, 8, 15 and 16) to cause the sand to distribute evenly to the feed pipes 19 leading to the nozzles 16 of the headers 15. From each side of both hoppers lead eight feed pipes 19, four of which lead to the nozzles 16 of an upper header and four to the nozzles of a lower header, the pipes 19 leading to the nozzles of the latter being curved or bent to clear the upper sides of the conveyer 1 as illustrated in Fig. 7.

To insure an even spread of sand on the gum, the nozzles 16 are of a special construction, and are fitted in the bosses 21 of the headers 15. The nozzles 16 are preferably flat and tapered (Fig. 10) and formed with a hole 20 in the shank 20ᵃ. When in position, the hole 20 is directly beneath the sand feed conduit or connection 22 (Fig. 9), the shanks 20ᵃ pressing back on to the air jets 23 screwed within the bosses 21. The nozzles 16 are removable from the bosses by unscrewing the set screws 22ᵃ, which pinch and hold them securely in position. The tapered or discharge ends of the air discharge nipples 23 terminate directly beneath the hole 20 in the shanks of the nozzles, and the sand conduit or connection 22 so that the sand is fed from the pipes 19 directly on to or just in front of the air blasts from the jets, and is forced out through the nozzles 16 on to the gum on the conveyer 1.

The gum is preferably packed in trays 25 of an open mesh (Figs. 6, 7 and 12), the trays being placed on the cross slats 5, although the conveyer itself may be formed of open meshed netting, so that trays will not be necessary, but in any case, the trays are required where small gum is being dealt with.

The bottom of the cabinet 11 below the conveyer 1 is constructed with three of its sides 26, 27, 28 (Figs. 1, 2 and 6) converging to the sand pit 29 so that the used sand is, after falling through the screen 30 which is placed above, and is the same shape as the converging portions of the sides 26, 27 and 28, gravitated to the pit 29, where it is picked up by the bucket elevator 31 and deposited in the chute 32 (Figs. 1 and 2) from where it runs by gravity through the pipes 33 back to the hoppers 17 to be used over again. The object in screening the used sand before it gravitates to the sand pit 29, is to catch and to save any pieces of gum that may be dislodged from the endless conveyer 1 during the transit of the gum through the cabinet 11, and in the event of this happening and owing to the screen 30 being arranged above the converging portions of the sides 26, 27 and 28 of the cabinet and being formed in a similar manner thereto, the gum will be gravitated to the door 34 and so be saved and recovered.

Also, where the bucket elevator 31 discharges the sand into the chute 32, further screens 35 of different meshes are provided to prevent the possibility of foreign matter or gum being fed into the hoppers 17, and so choking the feed pipes 19, injuring the gum, or causing other damage.

Extending downward through the top of the cabinet 11 are the pipes 37 connected with a suction fan 38 (Figs. 6 and 7). Through these pipes 37 by means of the suction fan 38 the dust caused by the action of the sand blasts on the casing or incrustations of the gum, is drawn off from the cabinet 11 and forced into the pipe 39 leading to the settling room 40. The pipe 39 is specially constructed so as to widen or expand at its outlet 41 (Figs. 7 and 8), within the settling room with the result that the current of air from the pipe 39 is destroyed or loses its power at the exit or expansion allowing the heavier dust and any sand that may have been drawn up by the fan 38 to fall by gravity into the recess or trap 42 from whence it is returned to the hoppers 17 through the chute 43 and pipe 44. The lighter dust rises and settles in the settling room 40 and is otherwise dealt with.

Instead of using the bucket elevator 31 to return the used sand to the hoppers, a suction elevator 49 may be used as illustrated in Figs. 7 and 8. In this case the sand pit 45 is closed and is situated at the opposite side of the cabinet 11 to before, the sand being gravitated thereto by making the three sides 26, 27 and 46 converge to the pit 45. In this case, an additional suction fan 46 driven from the same pulley 47 as the fan 38 is provided on top of the cabinet 11 to lift the sand from the pit 45 into the pipe 48 also leading into the settling room 40.

The pipe 48 is constructed in a similar manner to the pipe 39 so that the current of air within it loses its power or is destroyed by the expansion 50 of the pipe 48 within the settling room, causing the sand to drop by gravity into the trap or recess 51 and be gravitated back to the hoppers 17 by the chute 43 and pipe 44, and the light dust to enter the settling room.

In the header illustrated in Figs. 13 and 14, extra air discharge nipples 54 are provided to the nozzles 16 at the back of the sand feed connections 22. These extra air discharge nipples are fitted in the nozzle bosses 21 at an angle to the sand feed connections as shown and obtain their air blasts from the header through the extra pipes 56. The object in having the angular extra discharge nipples 54 fitted in the nozzle bosses 21 behind the sand connections 22 as shown is, in the case of the lower headers to prevent any choking or blocking of the sand feed pipes 19 and ordinary nipples, owing to the sand running back into the nipples and headers when the blast is not operating, with the upper headers this is not necessary owing to the downward direction of the nozzles causing the sand to flow clear of the nipples.

In Figs. 15 and 16 are shown a plan view and a sectional elevation of one of the sand hoppers 17. The inverted V shaped partition 18 is given a slight curve on both sides, to insure the sand running to the feed pipes 19 at the ends of the hoppers on each side as well as to the more central pipes, thus obtaining an even flow of sand to all the nozzles of the different headers.

To obtain a more even discharge of sand from the before-described nozzles, an alternate form of air jet is provided (Fig. 17), pierced so as to provide three jets of air within the one nozzle. This is obtained by forming the jet with three openings or apertures therein, the central opening or aperture 57 being located so as to provide a middle jet passing centrally down the nozzle, and the other openings or apertures 58, 59, being pierced one on each side of the central opening 57 at an angle so that the jets of air therefrom pass down the sides of the tapered nozzles and form forked blasts. The employment of this jet results in a very even spread of sand on the gum, without the blast in any way being weakened or losing its power.

The above-described machine is adapted to be driven by any suitable power, through belting, gearing or any other form of transmission of power, the suction fans and the sand elevator may be driven from the same shafting as the driver for the endless gum conveyer, so that all operations may commence or cease simultaneously or each or any of the different operations may run or be worked independently of the other operations, so that the gum conveyer can remain stationary, while the remaining operations are being performed, this will be necessary where it is desired to treat the gum while stationary.

The headers or sets of headers may be so arranged and connected that the gum in passing through the cabinet or casing will be subjected to treatment by blasts of different forces and containing sand of different qualities or grades. The treatment above mentioned may be applied to the gum either alone or in conjunction with independent blasts of steam or and compressed air only, the order of the various sand, air, and steam blasts being arranged so that the gum emerges from the cabinet in a more highly finished state than with the sand blasts alone.

This last described method of treatment has the effect of causing the gum to be produced in a highly finished or polished state, the treatment with coarse sand preferably taking place first, and the treatment with the finer sand taking place at or near the end of the process.

The gum dust or like admixture of powdered sand and dust drawn off from the cabinet or casing by the suction fans and pipes and conveyed to the settling room, forms a product of considerable value, having high polishing properties and useful in the manufacture of commodities which the low grade gums are adapted for.

I claim:

1. In an apparatus for the treatment of kauri and like gums, an air header, means for conveying compressed air thereto, bosses formed on said header, air discharge nipples within said bosses, said nipples being each provided with an aperture communicating with the interior of said header, nozzles adapted to enter said bosses, said bosses and nozzles being provided with mating orifices, means for conveying sand to said nozzles through said orifices, and means for retaining said nozzles in said bosses.

2. In an apparatus for the treatment of kauri and like gums, an air header, means for conveying compressed air thereto, bosses formed on said header, air discharge nipples within said bosses, said nipples being each provided with a central aperture, outwardly flaring nozzles adapted to enter said bosses, said bosses and nozzles being provided with mating orifices, means for conveying sand to said nozzles through said orifices, and means for retaining said nozzles in said bosses.

3. In an apparatus for the treatment of kauri and the like gums, a rotatably adjustable cylindrical header, means for conveying compressed air to said header, radially directed nozzles attached to said header, means for conveying sand to the interior of said nozzles, and a supporting means coöperating with said nozzles.

4. In an apparatus for the treatment of kauri and like gums, a plurality of rotatably adjustable cylindrical headers disposed in the same horizontal plane, said headers being arranged in series with the intermediate headers out of vertical alinement with the end headers, means for conveying compressed air to said headers, radially directed nozzles attached to said headers, and a traveling supporting means coöperating with said nozzles.

5. In an apparatus for the treatment of kauri and like gums, a cylindrical header, bosses formed radially thereon, nozzles removably inserted within said bosses and flaring outwardly therefrom, means for discharging air from the interior of said headers into said nozzles, and means to convey sand into said nozzles.

6. In an apparatus for the treatment of kauri and like gums, an air header, bosses formed thereon, nozzles removably inserted within said bosses, air discharge nipples in the base of said bosses and protruding into said nozzles, and means for conveying sand to said nozzles.

7. In an apparatus for the treatment of kauri and like gums, an air header, bosses formed thereon, nozzles inserted within said bosses, means for introducing sand into said nozzles, and air discharge nipples entering said nozzles behind the point of delivery of said sand conveying means.

8. In an apparatus for the treatment of kauri and like gums, an air header, bosses formed thereon, nozzles inserted within said bosses, means for introducing sand into said nozzles, and air discharge nipples entering said nozzles behind the point of delivery of said sand conveying means and at an angle to said sand introducing means.

9. In an apparatus for the treatment of kauri and like gums, a header, bosses formed thereon, nozzles inserted therein, air discharge nipples in the base of said bosses and protruding into said nozzles, said nozzles and bosses being provided with mating orifices, and means for introducing sand into said nozzles through said orifices.

10. In an apparatus for the treatment of kauri and like gums, an endless conveyer; a cabinet through which said conveyer passes; open meshed trays supported on said conveyer; independently rotatable cylindrical air headers situated above and below said conveyer; radially directed bosses formed on said air headers; nozzles removably inserted in said bosses; air discharge nipples in the base of said bosses and protruding into said nozzles; and means for conveying sand to said nozzles.

11. In an apparatus for the treatment of kauri and like gums, an endless conveyer; a cabinet through which said conveyer passes; open meshed trays supported on said conveyer; a plurality of adjustable cylindrical air headers situated above said conveyer; and arranged in a series in the same horizontal plane with the intermediate headers out of vertical alinement with the end headers; and a plurality of adjustable cylindrical air headers situated below said conveyer and arranged in a series in the same horizontal plane with the intermediate headers out of vertical alinement with the end headers; and radially directed nozzles attached to said headers, for directing sand against said conveyer.

12. In an apparatus for the treatment of kauri and like gums, an endless conveyer, a cabinet constructed centrally over said conveyer, openings in said cabinet, box-like extensions over said openings and through which the upper side of said conveyer passes, a lower tunnel formation in said cabinet and through which the lower side of said conveyer passes, a sand pit, the sides of said cabinet below said conveyer converging to said sand pit.

13. In an apparatus for the treatment of kauri and like gums, an endless conveyer, a casing disposed centrally over said conveyer, a tunnel within said casing through which the lower run of said conveyer passes, the roof of said tunnel being downwardly inclined, a sand pit, the sides of said casing below said conveyer converging to said sand pit, and a screen within said cabinet above the converging sides thereof.

14. In an apparatus for the treatment of kauri and like gums, an endless conveyer, a casing disposed centrally over said conveyer, a tunnel within said casing through which the lower run of said conveyer passes, the roof of said tunnel being downwardly inclined, a sand pit, the sides of said casing below said conveyer converging to said sand pit, and an inclined screen within said cabinet above the converging sides thereof.

15. In an apparatus for the treatment of kauri and like gums, an endless conveyer, a casing disposed centrally over said conveyer, a tunnel within said casing through which the lower run of said conveyer passes, the roof of said tunnel being downwardly inclined, a sand pit, the sides of said casing below said conveyer converging to said sand pit, an inclined screen within said cabinet above the converging sides thereof, hoppers situated above said casing, and an elevator for returning used sand from said sand pit to said hoppers.

FRANK VICTOR RAYMOND.

Witnesses:
GEORGE WILLIAM BASLEY,
MARY CHRISTINA BRENNAN.